United States Patent
Koepf et al.

(10) Patent No.: US 7,970,496 B2
(45) Date of Patent: *Jun. 28, 2011

(54) SYSTEM AND METHOD FOR PROVISIONING A VEHICLE INTERFACE MODULE

(75) Inventors: Gerhard Koepf, Boulder, CO (US); Robert Yandrofski, Denver, CO (US); Roy G. Perry, Nashville, TN (US); Jonathan Cooper, Denver, CO (US)

(73) Assignee: Inilex, Inc., Chandler, AZ (US)

(\*) Notice: Subject to any disclaimer, the term of this patent is extended or adjusted under 35 U.S.C. 154(b) by 0 days.

This patent is subject to a terminal disclaimer.

(21) Appl. No.: 12/852,047

(22) Filed: Aug. 6, 2010

(65) Prior Publication Data

US 2010/0299020 A1 Nov. 25, 2010

Related U.S. Application Data

(63) Continuation of application No. 11/613,047, filed on Dec. 19, 2006, now Pat. No. 7,818,098.

(51) Int. Cl.
*G06F 7/00* (2006.01)
*G01M 17/00* (2006.01)

(52) U.S. Cl. .............................. 701/1; 701/29
(58) Field of Classification Search .............. 701/1, 29, 701/33, 36; 702/182–185
See application file for complete search history.

(56) References Cited

U.S. PATENT DOCUMENTS

| 6,853,894 B1* | 2/2005 | Kolls .............................. 701/29 |
| 7,791,503 B2* | 9/2010 | Breed et al. ..................... 340/993 |
| 2005/0060070 A1* | 3/2005 | Kapolka et al. ................. 701/29 |

\* cited by examiner

*Primary Examiner* — Yonel Beaulieu
(74) *Attorney, Agent, or Firm* — The Noblitt Group, PLLC

(57) ABSTRACT

The present invention provides systems and methods for provisioning a vehicle interface module comprising receiving a VIM from a VIM manufacturer and entering appropriate VIM data into a dealer inventory, activating a SIM card for the VIM and installing the VIM in a predetermined vehicle, selecting a wireless activated VIM from the dealer inventory and connecting the VIM to an OBD-II port of the vehicle, connecting a configuration PC to the VIM and downloading a modem configuration, selecting and downloading a vehicle-specific configuration file, accessing a telematics services provider's web portal, entering appropriate vehicle data, and associating the vehicle with the VIM, installing the VIM in the predetermined vehicle, and conducting an installation verification test.

22 Claims, 4 Drawing Sheets

SYSTEM AND METHOD FOR PROVISIONING A VEHICLE INTERFACE MODULE

CROSS REFERENCE TO RELATED APPLICATION

This application is a continuation of U.S. patent application Ser. No. 11/613,047, filed on Dec. 19, 2006, now U.S. Pat. No. 7,818,098 entitled "System and Method for Provisioning a Vehicle Interface Module," and incorporates the disclosure of the application by reference. To the extent that the present disclosure conflicts with any referenced application, however, the present disclosure is to be given priority.

FIELD OF THE INVENTION

The present invention relates generally to systems and methods for provisioning a vehicle interface module, at the manufacturer level, at the dealership level, and at the telematics services provider level.

BACKGROUND OF THE INVENTION

Telematics systems typically combine telecommunications and information processing, and frequently involve automobile systems that combine global positioning system (GPS) satellite tracking and wireless communications for automatic roadside assistance and remote diagnostics. Some vehicle telematics systems monitor for diagnostic trouble codes in the vehicle that are formed from sensory inputs from various electronic modules in the vehicle.

Telematics systems promise to combine vehicle safety, entertainment and convenience features through wireless access to distributed networks, such as the Internet. Such systems are distinguishable from hardware-centric audio and vehicle control systems that are built into devices custom designed for each vehicle. By contrast, vehicle telematics systems may include infotainment delivered by plug-and-play hardware whose functionality can be upgraded through software loads or simple module replacement. It is anticipated that significant new revenue streams will be opened up to automobile manufacturers and service providers through the products and services made available through telematics systems.

In the field of vehicle telematics, technologies have been devised that contribute to expanding the use of commercial and personal vehicles from merely a form of transportation to acting as communication hubs. According to these technologies, a vehicle is able to communicate wirelessly with remote systems in order to serve or facilitate a number of objectives including related to safety, navigation, information gathering, entertainment and education. Communications with the vehicle typically involve a cellular phone or other communication device that is able to send and receive communications from outside the vehicle.

Beginning with model year 1996, the Environmental Protection Agency (EPA) requires vehicle manufacturers to install on-board diagnostics (OBD-II) for monitoring light-duty automobiles and trucks. OBD-II systems include microcontrollers and sensors that monitor the vehicle's electrical and mechanical systems and generate data that are processed by a vehicle's engine control unit (ECU) to detect any malfunction or deterioration in the vehicle's performance. Most ECUs transmit status and diagnostic information over a shared, standardized electronic bus in the vehicle, which effectively functions as an on-board computer network with many processors that transmit and receive data. The primary computers in this network are the vehicle's electronic-control module (ECM) for monitoring engine functions and power-control module (PCM) for monitoring the vehicle's power train. Data available from the ECM and PCM include vehicle speed, fuel level, engine temperature, and intake manifold pressure.

Data from the above-mentioned systems are made available through a standardized, serial 16-cavity OBD-II connector, which usually is disposed underneath the vehicle's dashboard. When the vehicle is serviced, data from the vehicle's ECM and/or PCM is typically queried using an external engine-diagnostic tool that plugs into the OBD-II connector. The vehicle's engine is turned on and data is transferred from the engine computer, through the OBD-II connector, and to the external engine-diagnostic tool. The data is then displayed and analyzed to service the vehicle. Some vehicle manufacturers also include complex electronic systems in their vehicles to access and analyze some of the above-described data. By way of example, General Motors includes in some vehicles a system called "On-Star", which collects and transmits data through a wireless network. On-Star systems are not connected through the OBD-II connector, but instead are wired directly to the vehicle's electronic system when the vehicle is manufactured.

SUMMARY OF THE INVENTION

The present invention provides systems and methods for provisioning a vehicle interface module (VIM). At the manufacturer's level, a method for provisioning a VIM comprises manufacturing the VIM, installing a test SIM card, configuring the VIM, performing a functional test to verify VIM performance, changing the default on-board application from test to operational, replacing the test SIM card with an inactive VIM specific SIM card, and shipping the VIM to a predetermined dealership. The VIM may be configured for a default vehicle such that the VIM requires customization for a specific vehicle make and model, and the associated SIM card is de-activated. According to the invention, the step of installing the test SIM card comprises inserting the test SIM card in an associated SIM card holder in the VIM, and the step of configuring the VIM comprises connecting the VIM via a serial port to an installation PC to provide access to various software applications. For example, the software applications may comprise a VIM off-board application, a VIM on-board test application, a VIM default configuration file, and a VIM on-board operational application. The step of configuring the VIM further comprises opening the VIM off-board application on the installation PC, downloading the VIM on-board test application, activating the on-board test application using the off-board application, entering the SIM configuration data in the off-board application, downloading the wireless modem configuration, and downloading the default vehicle configuration.

In the above method, the step of changing the on-board application from test to operational may comprise up-loading and activating the VIM on-board operational application using the VIM off-board application. In addition, the step of replacing the test SIM card with an inactive VIM specific SIM card may entail replacing the SIM configuration data in the VIM off-board application and downloading the new modem configuration. According to some embodiments, the method may further comprise sending a summary VIM flat file to the vehicle telematics services provider upon shipping the VIM to the a predetermined dealership, wherein the VIM flat file includes all VIM-relevant data and shipping destination information. Additionally, the step of installing a test SIM card may comprise installing a pre-activated SIM card, and the step of replacing the test SIM card may comprise de-activating the SIM card.

At the dealership level, a method for provisioning a VIM comprises the steps of: (a) receiving a VIM from a VIM manufacturer and entering appropriate VIM data into a dealer inventory; (b) activating a SIM card for the VIM and installing the VIM in a predetermined vehicle; (c) selecting a wireless activated VIM from the dealer inventory and connecting the VIM to an OBD-II port of the vehicle; (d) connecting a configuration PC to the VIM and downloading a modem configuration; (e) selecting and downloading a vehicle-specific configuration file; (f) accessing a telematics services provider's web portal, entering appropriate vehicle data, and associating the vehicle with the VIM; (g) installing the VIM in the predetermined vehicle; and (h) conducting an installation verification test. In particular, steps (a) and (b) are performed by a dealer, and steps (c) to (h) are performed by a service technician.

According to the method at the dealership level, step (b) may further comprise generating install orders for the service technician. The method may also comprise the steps of logging into the telematics service provider's web portal and entering a VIM-vehicle association into the telematics service provider's database. In addition, step (h) may comprise turning an ignition of the vehicle on and off and observing a registration record on the telematics services provider's web portal. Upon successfully conducting the installation verification test, the vehicle may be released for sale.

At the telematics services provider level, a method for provisioning a VIM comprises receiving a VIM flat file from a VIM manufacturer, the flat file including all VIM-relevant data and shipping destination information, entering the VIM-relevant data in a telematics database using the flat file, and associating the VIM with a dealer receiving the VIM. The step of entering the VIM-relevant data in a telematics database may comprise setting up a future association of the VIM with a vehicle and a customer of the telematics service provider.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWING

Embodiments of the present invention will now be described, by way of example only, with reference to the following drawings, in which:

FIG. 2A is a flowchart illustrating the provisioning and service activation steps of a preferred method for provisioning a VIM at the manufacturer level using a test SIM card, while FIG. 2B illustrates the provisioning and service activation steps at the manufacturer level without using a test SIM card;

DETAILED DESCRIPTION OF EXEMPLARY EMBODIMENTS

Figure 1:
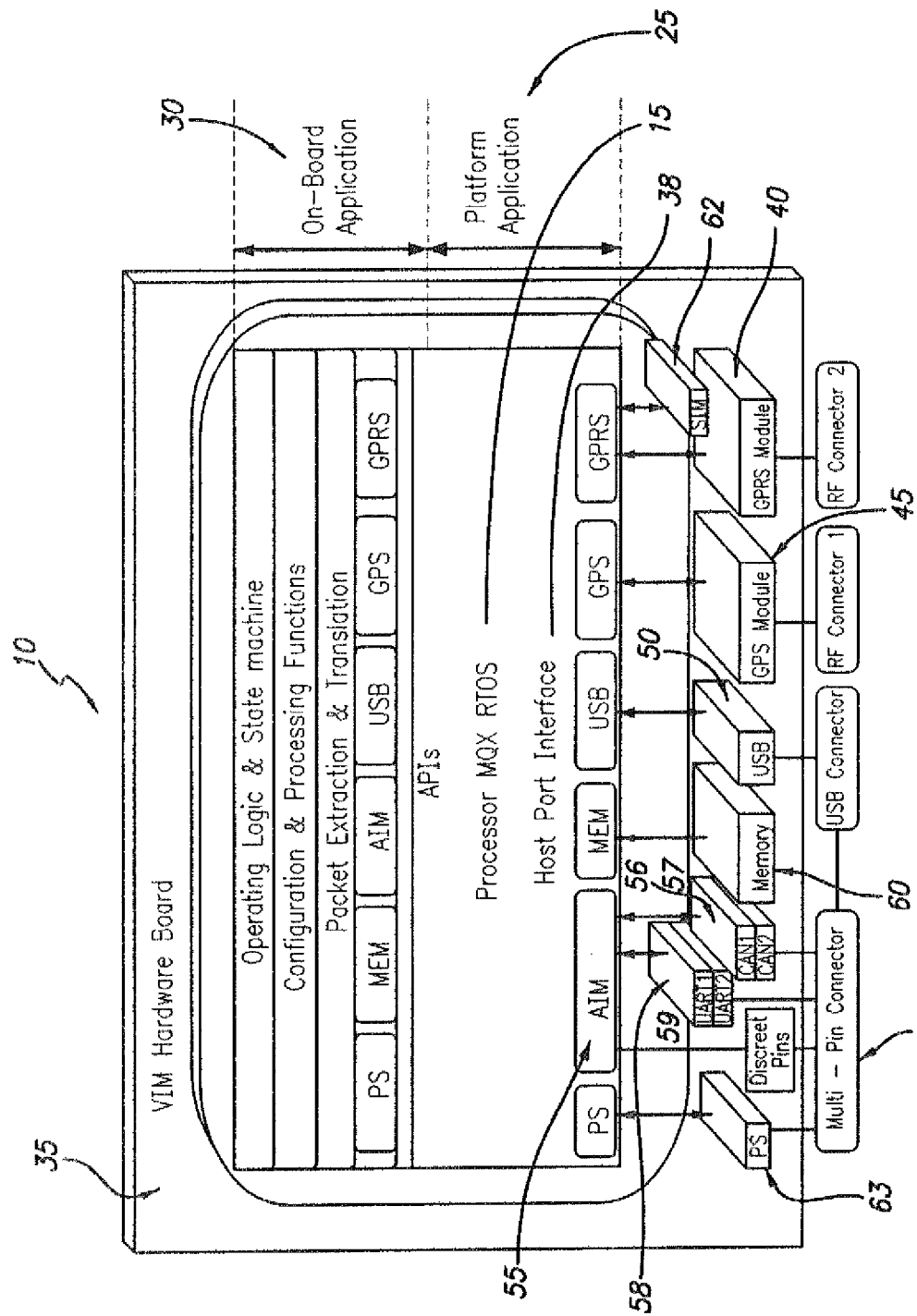
FIG. 1 is a schematic diagram illustrating a preferred VIM platform manufactured in accordance with the principles of the invention.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Before starting a description of the Figures, some terms will now be defined.

Activated VIM: A VIM having an activated communication service with a wireless service provider (in case of Global System for Mobile Communications (GSM) service, using SIM card activation process).

Configuration PC: A computer used (e.g., by a dealership service technician) for configuring and testing VIMs prior to and during installation.

Default Configuration File: A vehicle-specific network protocol that may be used for functional testing at the manufacturer, and is replaced during installation.

Flat File: A list containing manufactured VIMs and associated identifiers that may be shipped to an appropriate dealership.

Functional Test: A test performed (e.g., at the manufacturer) to verify functional compliance with various system requirements.

Installation PC: A computer used by the manufacturer (i) to perform various functions such as the installation of VIM platform firmware and software applications (e.g., on-board application, modem configuration, and vehicle configuration), and/or (ii) to perform functional testing.

Installation Verification Test: A test performed (e.g., by a dealership service technician) to verify the functional operation of installed VIMs.

Modem: A wireless transceiver for wireless VIM communications with a server (e.g., of the telematics services provider).

Modem Configuration: A process for VIM-specific modem configuration (e.g., including modem identifiers, SIM card configuration data, a server static IP number, and wireless service provider data).

OBD-II: A vehicle's on-board diagnostic port that can be used to determine whether there is a malfunctioning vehicle component utilizing the vehicle's computer system.

Off-Board Application: A software application (e.g., residing on the installation PC) that may be used for installing firmware files, on-board application files, default configuration files (modem and vehicle), and the functional test software application.

On-Board Application: A software application (e.g., residing on the installation PC) that may include an on-board test application and an on-board operational application.

On-Board Operational Application: A software application that interfaces with the VIM platform over application programming interfaces and controls the operation of the VIM and its interfaces during VIM operation.

On-Board Test Application: A software application that interfaces with the VIM platform over application programming interfaces and controls the operation of the VIM and its interfaces during VIM functional testing.

Operational SIM Card: A subscriber identity module (SIM) card used for VIM communications with a server of the telematics services provider during operation.

SIM Activation: A process for activating wireless service.

Telematics Database: A central database that is part of the server of the telematics services provider (e.g., used for storing vehicle related information such as vehicle identity data, vehicle operational data, vehicle owner data, and telematics service data).

Telematics Web Portal: A web portal with rule-based access for telematics services users such as customers and dealership service technicians.

Test SIM Card: A SIM card that is activated with a wireless service provider and used for temporary functional testing (e.g., at the manufacturer's location).

Vehicle Configuration File: A vehicle-specific network protocol that provides communications between the VIM and specific vehicle makes and models.

VIM: A vehicle interface module that includes the VIM platform and on-board application.

VIM Association: A database association between (i) a specific VIM, identified by one or more unique VIM identifiers, modem identifiers, and/or SIM card identifiers, and (ii) a specific vehicle, identified by a unique VIN and other features such as make, model, year, and color.

VIM Inventory: A record of VIMs (e.g., at a dealership), including activated and non-activated VIMs, that is delivered from manufacturer but not yet installed in vehicles.

VIM Platform: A platform including (i) a mechanical housing with interconnects to the vehicle (OBDII), configuration and installation PC (serial port), communications antenna, and GPS antenna, (ii) a circuit board with processor, wireless modem, GPS receiver, automotive network interface hardware, power supply, serial port interface, and memory, (iii) firmware controlling platform operation, and (iv) application programming interfaces to the on-board application.

The present invention is directed to systems and methods for providing telematics solutions for the consumer telematics market in the areas of in-vehicle safety, security, operation and performance These telematics solutions may comprise aftermarket products that are sold through automotive dealerships at the time of the initial sale of the vehicles. According to some embodiments of the invention, the telematics solutions may be created specifically for automotive manufacturers that do not offer a complete set of telematics solutions. Secure communication links may be provided over cellular or WiFi networks back to a telematics services provider. The telematics services system of the invention includes a robust, flexible and scalable server and database architecture. Additionally, the telematics services system includes one or more software applications that interface with system users and the vehicles equipped with the VIMs of the invention. By way of example, the software applications may comprise a VIM off-board application, a VIM on-board test application, a VIM default configuration file (e.g., including VIM serial number, default VIN, and default vehicle configuration parameters), and a VIM on-board operational application.

The systems and methods of the invention involve provisioning one or more vehicle interface modules (VIMs), and providing service activation for the VIMs. Each VIM comprises hardware that may be installed by a service technician at a dealership, for example just before or just after the sale of a vehicle. The VIM is adapted to be connected to the vehicle's on-board data system including an ECU. The VIM may be used to provide various telematics solutions such as location information, safety and security information, vehicle operation information and vehicle performance information. The vehicle performance information may include without limitation: (1) diagnostics monitoring (e.g., for reading, analyzing and reporting current diagnostics data to dealership service departments); (2) fuel efficiency monitoring (e.g., for monitoring vehicle performance and reporting opportunities to improve fuel efficiency); and (3) in-dash navigation. The vehicle operation information may include without limitation: (1) current vehicle speed and engine RPM, (2) brake action status, (3) door ajar status, and (4) seat belt status.

The safety and security information provided by the telematics system may include, but is not limited to: (1) trouble code monitoring (e.g., to monitor vehicle performance, alert service departments when problems detected, and/or send monthly vehicle status reports); (2) vehicle tracking (e.g., for locating and/or tracking vehicles over the Internet); (3) remote door lock/unlock; (4) stolen vehicle recovery (e.g., to locate stolen vehicles and prevent engine from starting, or to detect unauthorized vehicle movement); (5) accident assistance (e.g., to alert the telematics services provider when an airbag has been deployed so that the provider can contact the driver and/or alert emergency authorities); and (6) roadside assistance (e.g., for flat tires or when the vehicles is out of gas). The telematics system may also be employed to offer entertainment and infotainment options, features that improve the ability for service technicians to remotely diagnose vehicle problems and download in-vehicle software upgrades, and improved emergency agency integration and correspondence, without departing from the scope of the invention.

The VIM platform of the invention comprises an integrated hardware module containing various interface modules to facilitate the various functions of the VIM. Specifically, the VIM includes a central processor that hosts an embedded real-time Operating System (OS) to run one or more software applications, such as comprising machine readable or interpretable instructions for operating the VIM. More particularly, the VIM software may comprise two broadly classified software components including an on-board application and a platform application. The integrated hardware module may comprise a housing with a plurality of connectors, a plurality of individual (modular) hardware interface modules, a central processor, an OS, and software for the platform application. The platform application may include application programming interfaces (APIs) for the on-board application and the basic executive functions based on the OS and the hardware interfaces host-port processing.

In accordance with the principles of the invention, the VIM comprises a state-of-the-art communications device including an on-board computer that may be installed inside the dash of a vehicle and connects to the vehicle's various data protocols. Once installed in the vehicle, the VIM is capable of reading messages from the vehicle (e.g., from the odometer or fuel gauge) and sending messages to the vehicle (e.g., to unlock doors). In addition, the VIM may be connected to the vehicle's power source in order to perform various functions whether or not the vehicle is running The VIM may include an integrated GPS chipset for pulling location information, as well as integrated cellular and WiFi chipsets for transmitting and receiving data from the telematics services provider. Software residing on the VIM is capable of hand-off between the WiFi and cellular networks without conflicts or security risks, in order to leverage both communication devices.

The VIMs are designed to be installed in vehicles by a service technician at a dealership in less than about an hour. Each vehicle that is enabled by the service provider requires the VIM to use a specific set of software designed to communicate with the associated vehicle. According to some embodiments, generic VIMs are distributed to dealerships, and then the appropriate software is added to the VIMs via over-the-air provisioning by the telematics services provider. This over-the-air process enables the provider to upgrade VIMs, offer new services, and fix problems without any further interaction by the service technician or customer.

According to the invention, the VIM further comprises an on-board processor and memory. Rather than sending all the codes received from the vehicle to be processed by an outside server, the VIM may process data from the vehicle and only send the necessary information over the communication networks when requested or during pre-programmed intervals (e.g., when the vehicle is turned off). This reduces the amount of data sent over the communications network, thereby reducing the cost of providing the service. In addition, the on-board processor may be pre-programmed to look for certain codes or events, and send real time alerts when one of the codes or events is detected.

The telematics services system of the invention may be accessed by customers and dealers via the Internet, an automated telephone attendant, or through an in-vehicle screen or button. When a vehicle is stolen, an emergency agency receives a case specific access ID that may be used to logon to the service provider's website and only track the location of the stolen vehicle once a stolen vehicle report number is reported to the provider. In the event of an accident, a customer service representative of the provider immediately creates a new access ID for emergency agencies to be able to access all pertinent information about the accident. At predetermined intervals (e.g., once a month), the service provider will send a message (e.g., via email), which details the current primary diagnostic readings from the vehicle and provides a report setting forth the vehicles mileage and average fuel consumption over the predetermined interval.

In operation, a VIM is installed in a vehicle and is used to monitor the status of the vehicle from information from various sources such as automotive interface module (AIM) messages. Such messages may include controller area network CAN interface messages (CAN1, CAN2), and Universal Asynchronous Receiver-Transmitter (UART) based protocol interface messages (UBP, K-line). Additional information about the vehicle is gathered by the VIM over the GPS and General Packet Radio Service (GPRS) interfaces. The information may be stored locally on the VIM for later retrieval on demand by the provider's telematics server or using applications over the universal serial bus (USB) interfaces.

Referring to FIG. 1, a preferred VIM platform 10 manufactured in accordance with the principles of the invention comprises an integrated hardware module that contains a central processor (CPU) 15 hosting an embedded real-time OS that runs a platform application (VIM interface software) 25 and an on-board application (VIM functional software) 30. The VIM platform 10 comprises a VIM hardware board 35 disposed within a mechanical enclosure having connectors to the vehicle network(s), the vehicle battery and ground, a personal computer (PC), and external antennas. In addition, the VIM platform 10 may include interfaces 38 to one or more hardware modules, including, but not limited to: (1) a GPRS module 40 (e.g., for wireless communication to the telematics system); (2) a GPS module 45 (e.g., to acquire accurate time and positioning information from the GPS satellites); (3) a USB module 50 (e.g., to communicate to an external application for configuration and diagnostics); (4) an AIM interface 55 to a plurality of CAN modules 56 and 57, UART modules 58 and 59, for vehicle interface messaging); (5) external memory module 60 used to store the firmware for the central processor and for dynamic storing of vehicle data and vital statistics, SIM module 62, and PS module 63); (6) a GPRS SIM module interface (e.g., for communicating with the SIM module 62 to read and write into the SIM card); and (7) a power supply module (e.g., to control the power modes based on one or more modes of operation of the VIM).

According to the invention, the central processor 15 on the VIM platform 10 is capable of processing millions of instructions per second in order to perform the OS processing, the platform application processing, the on-board application processing, and the hardware interface processing. In addition, the central processor 15 comprises a plurality of hardware interfaces 38, including an interface to the wireless (GPRS) module 40, to the GPS module 45, the USB module, to the memory module 60, to the power supply module 63, to the CAN1 module 56, to the CAN2 module 57, to UART1 module 58, to the UART2 module 59

With further reference to FIG. 1, the VIM platform 10 may include a robust, snap-on 16-pin connector 65, for example comprising: (1) two CAN high and two CAN low interface pins; (2) two UART pins; (3) four pins for general purpose VIM inputs and outputs; (4) a pin for vehicle battery voltage; (5) a pin for a signal ground; (6) four USB interface pins; and (7) a pin for a chassis ground. The VIM platform 10 may also includes a separate snap-on USB connector, as well as an internal connector from USB port 50 to appropriate pins on the 16-pin connector 65. The VIM platform's CAN interfaces are capable of receiving and transmitting standard frames with 11-bit and extended frames with 29-bit identifiers. The platform 10 supports access to one or more USB channels, and supports a plurality of programmable general-purpose I/Os (GPIO).

In operation, the VIM platform 10 may be configured to use the vehicle battery as the power source, for example using the OBD-II connector. The platform 10 supports a sleep mode with a minimal current draw on the vehicle battery that is preferably less than approximately 2.5 mA. While in the sleep mode, the platform 10 monitors activity on the CAN networks. Upon detecting CAN network activity, the platform 10 automatically powers up and initializes all its components. In sleep mode, the platform 10 is able to receive an email from the telematics server whenever coverage is available. The platform 10 automatically powers up and initializes all its components upon receiving the email from the telematics server. According to some embodiments, the VIM platform 10 remains powered up for approximately 3 seconds after removal of the battery source.

The VIM platform 10 preferably includes a housing such as a mechanical enclosure comprising a hard plastic enclosure with secure attachment points. According to some embodiments, the housing is less than about 9 inches long, 4.5 inches wide and 1.5 inches thick. The VIM platform 10 also includes a rugged standard mechanical interface for adaptable mounting to different vehicle makes and models. The platform 10 may further comprise a robust snap-on coaxial connector for an active external GPS antenna, as well as a robust snap-on coaxial connector for an external cellular antenna. The coaxial antenna connectors are grounded to the circuit ground inside the VIM platform 10.

The VIM platform 10 of the invention is preferably highly reliable in the field and environmentally friendly. According to some embodiments, the platform 10 preferably meets all the environmental specifications in place with respect to car radios. Additionally, the VIM platform 10 preferably does not interfere with the car radio, if present, in any of the VIM operating modes. The platform 10 may be subjected to various testing, including, but not limited to: (1) electromagnetic interference (EMI) testing; (2) temperature range testing; (3)

shock and vibration testing; (4) dust testing; (5) humidity testing; and (6) emissions testing.

As set forth above, the VIM platform 10 comprises one or more software applications for carrying out the functionality of the VIM. According to an implementation of the invention, the VIM platform 10 may contain three software layers, including the OS, the platform software, and the on-board application. In particular, the OS is the first layer on which the platform software runs as a second layer, wherein the on-board application comprises the third layer that runs on top of the platform layer. During use, the on-board application uses the APIs provided by the platform layer to communicate to the hardware interface modules. In addition, the on-board layer uses the functions and features provided by the OS including interrupts for other operations that may or may not relate to and/or be specific to the hardware interfaces.

According to the invention, the VIM platform 10 may be configured to support an embedded real-time OS that may support without limitation: (1) real-time multi-tasking; (2) task creation and prioritization; (3) semaphores for pre-emptive processing of tasks in the multi-tasking environment; (4) dynamic memory allocation; (5) host-port messaging; (6) TCP/IP socket programming; (7) messaging between tasks; and (8) timer and timer management. The selected OS is preferably capable of running on more than one particular target processor.

Upon power-up the platform 10 downloads the program code from non-volatile memory and powers up all hardware interfaces upon power-up. The platform 10 configures the VIM and all hardware interfaces based on the configuration data in the memory. Upon completion of this initialization, the platform application notifies the on-board application by sending a message with the status. This power-up and initialization completion message may be configured to support at least 16 status codes. Once the power-up and initialization completion message is received from the platform application with a success code, the on-board application enquires about the status of ignition and takes appropriate action based upon the status.

The platform application operates under the task priorities set forth by the on-board application, wherein the platform application provides APIs necessary to set the task priorities. In accordance with the principles of the invention, the platform application preferably provides program stubs (dummy routines) that are inserted in every functional routine of the platform application. The platform application also monitors the status of all hardware devices, reports any faults to the on-board application, and logs the faults to the non-volatile memory. If it is safe for the other VIM operations, the platform application will attempt to recover from the fault. However, the platform application will not attempt to reset the VIM or the hardware without explicitly requesting to do so through on-board commands or APIs. The platform application is adapted to log all diagnostic and static data to the non-volatile memory for non-recoverable faults and then report all faults exceptions, and errors to the on-board application.

The platform application software provides APIs to be used by the on-board application to configure, program and communicate with the VIM hardware modules. The central processor on the VIM provides APIs to interface to the wireless communications (GPRS) module. The platform application configures the wireless module, provides APIs for host-port interfacing to and from the wireless module (e.g., including-monitoring and control of modem status), provides APIs for communications to and from the wireless module, provides APIs for diagnostic testing of the wireless module, and provides APIs for reset and initialization of the wireless module. The central processor on the VIM also provides APIs to interface to the GPS module. Specifically, the platform application configures the GPS module, provides APIs for host-port interfacing to and from the GPS module, provides APIs for communications to and from the GPS module, provides APIs for diagnostic testing of the GPS module, and provides APIs for reset and initialization of the GPS module.

The central processor on the VIM further provides APIs to interface to the USB module. In particular, the platform application configures the USB interface, provides APIs for host-port interfacing to and from the USB interface, provides APIs for communications to and from the USB interface, provides APIs for VIM provisioning, provides APIs for diagnostic testing of the USB interface, provides APIs for reset and initialization of the USB interface. According to the invention, the platform application processes commands received over the USB interface irrespective of the state of processing of the VIM.

The central processor on the VIM provides APIs to interface to the AIM modules, including the CAN1, CAN2, UART1, UART2, and USB interfaces. Specifically, the platform application configures the CAN1 bus, provides APIs for configuring the CAN1 bus, provides APIs for host-port interfacing to and from the CAN1 module, provides APIs for communications to and from the CAN1 module, provides APIs for diagnostic testing of the CAN1 module, and provides APIs for Reset and Initialization of the CAN1 module. The platform application also configures the CAN2 bus, provides APIs for configuring the CAN2 bus, provides APIs for host-port interfacing to and from the CAN2 module, provides APIs for communications to and from the CAN2 module, provides APIs for diagnostic testing of the CAN2 module, and provides APIs for Reset and Initialization of the CAN2 module. In addition, the platform application configures the UART modules, provides APIs for configuring the UART modules, provides APIs for host-port interfacing to and from the UART modules, provides APIs for communications to and from the UART modules, provides: APIs for diagnostic testing of the UART module, and provides APIs for Reset and Initialization of the UART modules. The platform application also configures the USB bus, provides APIs for configuring the USB bus, provides APIs for host-port interfacing to and from the USB module, provides APIs for communications to and from the USB module, provides APIs for diagnostic testing of the USB module, and provides APIs for Reset and Initialization of the USB module.

The central processor on the VIM provides APIs to interface to the flash memory and the SRAM memory, and configures the memory. According to an embodiment of the invention, the platform application preferably supports at least 128 Mbytes of memory. The platform application provides APIs for allocating the memory, APIs for reading from and writing to the memory, APIs for diagnostic testing of the memory, and APIs for reset and initialization of the memory. The platform application may support storing dynamic data, as well as storing of two different copies of the platform application and different copies of the on-board application.

The central processor on the VIM provides APIs to interface to the power supply interface. Specifically, the platform application configures the power supply interface, provides APIs to program the power supply for different modes of operation of the VIM, provides APIs for diagnostic testing of the power supply interface, and provides APIs for reset and initialization of the power supply interface. According to the invention, the platform application is configured to report battery disconnect to the on-board application API. In addition, the platform application reports a "power-up complete" status to the on-hard application API.

The platform application also provides APIs to reset all hardware upon request from the on-board application. In particular, the platform application reloads the copy of firmware from the memory location indicated by the on-board application, and configures the VIM using the configuration data indicated by the on-board application. The platform application is configured to reset, reload and configure the VIM with program code and configuration data as indicated by the on-board application in any state of processing during the operation of the VIM.

Figures 2A, 2B:
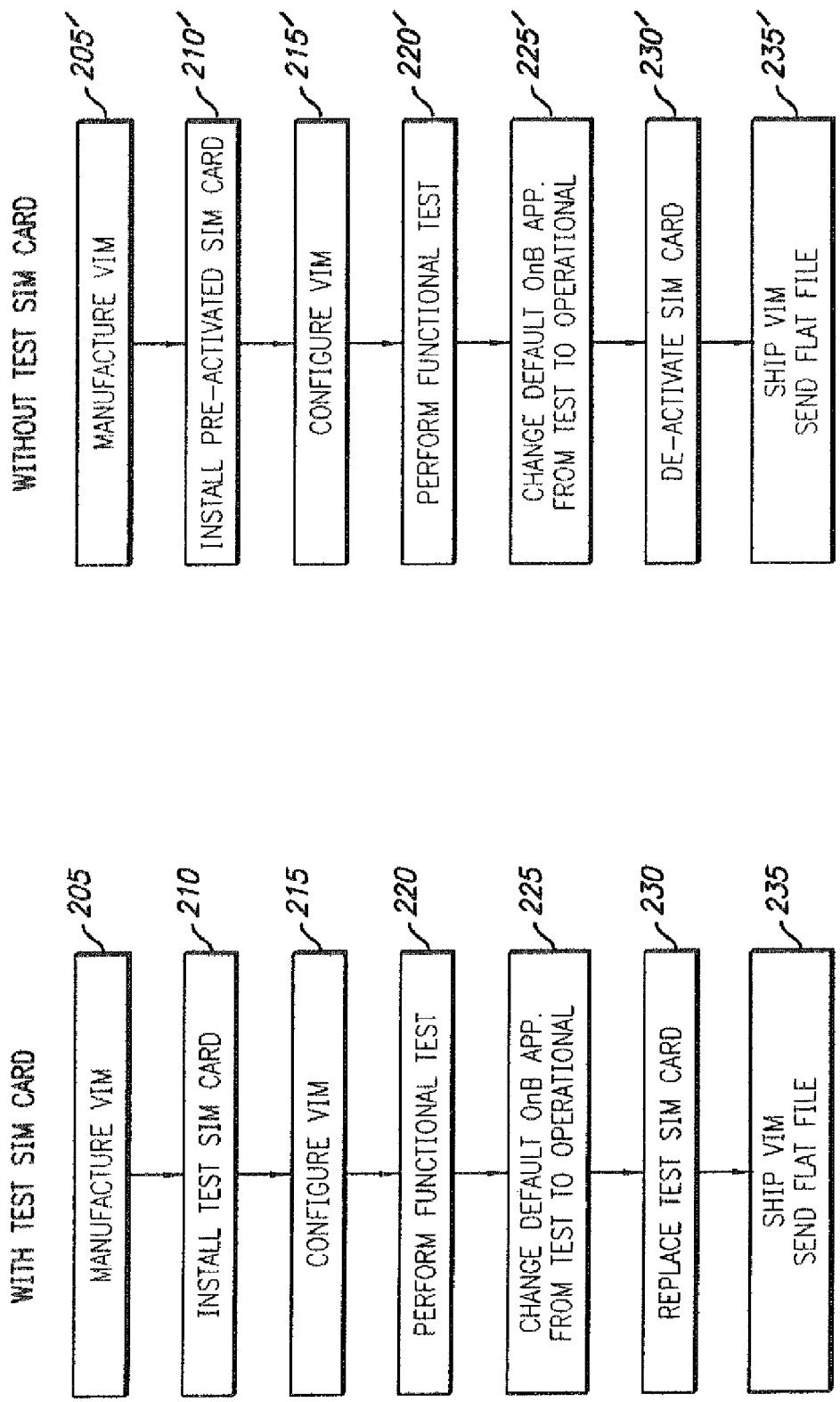

In accordance with the principles of the invention, a preferred method for provisioning a VIM for service will now be described with respect to FIGS. 2-4. Specifically, FIG. 2A illustrates the provisioning and service activation steps at the manufacturer level using a test SIM card, while FIG. 2B illustrates the provisioning and service activation steps at the manufacturer level without using a test SIM card (e.g., using a VIM-specific SIM card with a temporary activation). Referring to FIG. 2A, step 205 comprises manufacturing the VIM. Step 210 comprises installing the test SIM card. This step may entail inserting the SIM card in the associated SIM card holder in the VIM platform 10. Step 215 involves configuring the VIM, for example by connecting the VIM platform 10 via a serial port to an installation PC to provide access to various software applications such as the VIM off-board application, the VIM on-board test application, the VIM default configuration file, and the VIM on-board operational application. Step 215 may further involve opening the VIM off-board application on the installation PC, downloading the VIM on-board application, activating the on-board application using the off-board application, entering the SIM configuration data in the off-board application, downloading the wireless modem configuration, and downloading the default vehicle configuration. Downloading the wireless modem configuration may entail configuring the wireless modem by providing the appropriate SIM card ID, wireless provider ID, phone number, and static internet protocol (IP) for telematics server registration.

With continued reference to FIG. 2A, the method proceeds to step 220, which involves performing a functional test to verify VIM platform performance. Step 225 involves changing the default on-board application from test to operational. This step may entail up-loading and activating the VIM on-board operational application using the VIM off-board application. Step 230 involves replacing the test SIM card with an inactive VIM specific SIM card. This step may entail replacing the SIM configuration data in the VIM off-board application and re-loading the modem configuration data from the off-board application. Step 235 comprises disconnecting the VIM platform 10 from the PC and shipping the VIM platform 10 to the appropriate dealership. This step may further involve sending a summary VIM platform "flat" file to the vehicle telematics services provider. The flat file may include all VIM-relevant data in the shipment and the shipping destination information. VIMs that are delivered to dealers may be configured for a default vehicle such that these VIMs require customization for a specific vehicle make and model, and the associated SIM cards are not activated.

Referring to FIG. 2B, step 205' comprises manufacturing the VIM, while step 210' comprises installing a pre-activated SIM card. The step of installing the pre-activated SIM card may entail inserting the SIM card in the associated SIM card holder in the VIM platform 10. Step 215' involves configuring the VIM by connecting the VIM platform 10 via a serial port to an installation PC to provide access to various software applications including the VIM off-board application, the VIM on-board test application, the VIM default configuration file, and the VIM on-board operational application. Step 215' may further entail opening the VIM off-board application on the installation PC, downloading the VIM on-board application, activating the on-board application using the off-board application, entering the SIM configuration data in the off-board application, downloading the wireless modem configuration, and downloading the default vehicle configuration. Downloading the wireless modem configuration may entail configuring the wireless modem by providing the appropriate SIM card ID, wireless provider ID, phone number, and static internet protocol (IP) for telematics server registration.

With continued reference to FIG. 2B, the method proceeds to step 220', which involves performing a functional test to verify VIM platform performance Step 225' involves changing the default on-board application from test to operational by up-loading and activating the VIM on-board operational application using the VIM off-board application. Step 230' involves de-activating the SIM card, for example using an inactive VIM specific SIM card. Step 235' comprises disconnecting the VIM platform 10 from the PC and shipping the VIM platform 10 to the appropriate dealership. As set forth above with respect to FIG. 2A, this step may further involve sending a summary VIM platform flat file to the vehicle telematics services provider, the flat file may including all VIM-relevant data in the shipment and the shipping destination information.

Figure 3:
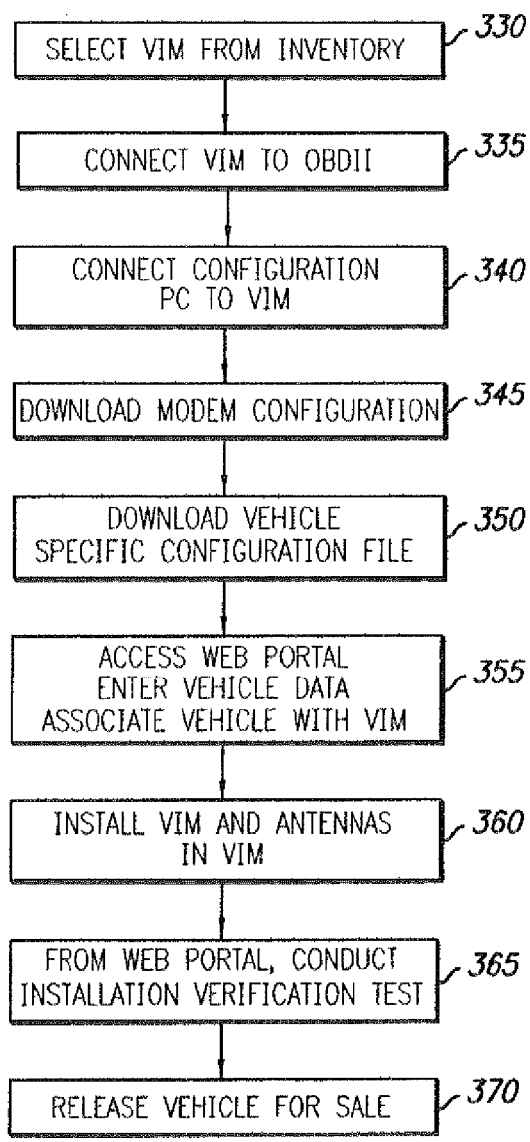
FIG. 3 is a flowchart illustrating the provisioning and service activation steps of a preferred method for provisioning a VIM at the dealership level.
Figure 3:
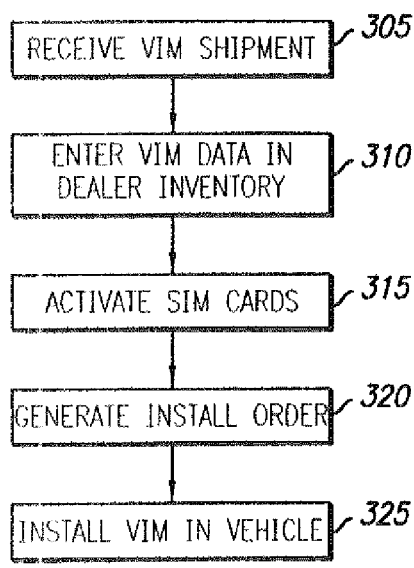

FIG. 3 illustrates the provisioning and service activation steps at the dealership level. In particular, the configuration for a specific vehicle make and model may be performed by a dealer service technician upon installation of the VIM in the vehicle. For this purpose, the technician may employ a configuration application residing on his or her PC, such as including configuration files for all vehicles sold in the dealership. Referring to FIG. 3, step 305 involves receiving a VIM shipment from the VIM manufacturer, while step 310 involves entering the VIM data into the dealer inventory upon receiving the VIM shipment. In step 315, the dealer activates SIM cards for one or more VIMs with the wireless service provider. In step 320, the dealer generates install orders for the service technician, and in step 325, the dealer installs the VIMs in the appropriate vehicles.

With further reference to FIG. 3, upon receiving the install orders, the service technician selects a wireless activated VIM from the dealer inventory in step 330. In step 335, the service technician connects the VIM to the OBD-II port, and in step 340, connects the configuration PC to the VIM. Step 345 involves downloading the modem configuration, whereas step 350 involves selecting and downloading the vehicle specific configuration file, using the configuration application. In step 355, the service technician accesses the web portal, enters the vehicle data, and associates the vehicle with the VIM. In step 360, the service technician installs the VIM in the appropriate vehicle (including appropriate antennas). The service technician may then log into the telematics service provider's web portal (e.g., over a PC internet connection) and enter the new VIM—vehicle association into the provider's database, which identifies the VIM records with the future vehicle owner and the provider's service user. In step 365, the service technician conducts an installation verification test (e.g., by turning the ignition on and off and observing a registration record on the provider's web portal). Step 370 entails releasing the vehicle for sale.

Figure 4:
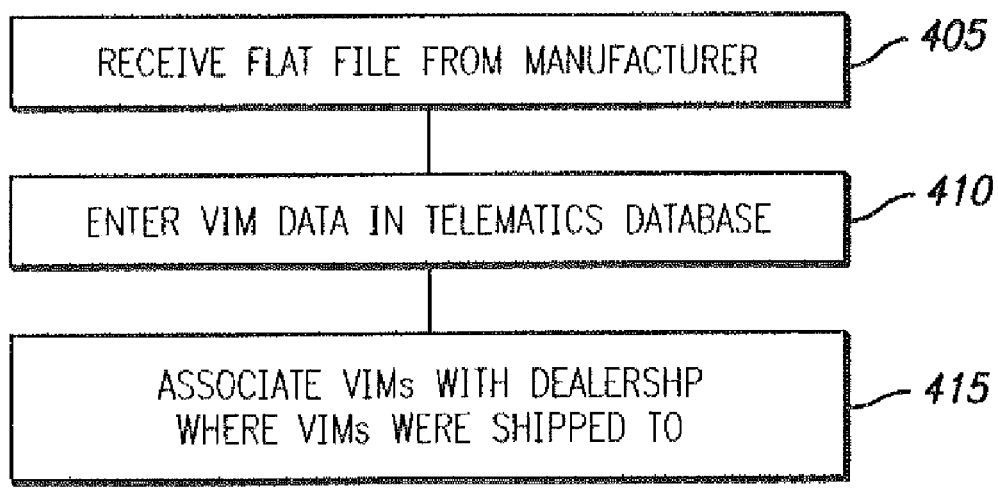
FIG. 4 is a flowchart illustrating the provisioning and service activation steps of a preferred method for provisioning a VIM at the telematics services provider level.

FIG. 4 illustrates the provisioning and service activation steps at the telematics service provider level. In particular, step 405 involves receiving the flat file from the VIM manufacturer, whereas step 410 involves entering the VIM data in the provider's telematics database using the flat file. Step 410 may further entail setting up the future association of a VIM with a vehicle and a customer of the telematics service provider. Step 415 involves associating the VIMs with the dealership receiving the associated shipment. According to an alternative implementation of the invention, the service technician may use the web portal to download the vehicle specific configuration file "over-the-air" instead of using a configuration application in his or her PC. This "over-the-air" capability provides downloading of improved versions of the vehicle specific configuration file as well as VIM on-board operational applications at a later time.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well. Therefore, the present invention should not be seen as limited to the forms shown, which is to be considered illustrative rather than restrictive.

The invention claimed is:

1. A method for provisioning a VIM, comprising:
    manufacturing the VIM;
    activating a wireless communication of the VIM;
    configuring the VIM;
    performing a functional test to verify VIM performance;
    changing a default on-board application from test to operational;
    deactivating the wireless communication; and
    shipping the VIM to a predetermined dealership.

2. The method of claim 1, wherein activating the wireless communication comprises installing a test SIM card.

3. The method of claim 2, wherein installing the test SIM card comprises inserting the test SIM card in an associated SIM card holder in the VIM.

4. The method of claim 1, wherein deactivating the wireless communication comprises replacing a test SIM card with an inactive VIM specific SIM card.

5. The method of claim 4, wherein replacing the test SIM card with the inactive VIM specific SIM card comprises replacing a SIM configuration data in a VIM off-board test application and reloading a modem configuration.

6. The method of claim 1, wherein the VIM is configured for a default vehicle such that the VIM requires customization for a specific vehicle make and model.

7. The method of claim 1, wherein configuring the VIM comprises connecting the VIM to provide access to multiple software applications.

8. The method of claim 7, wherein the software applications comprise a VIM off-board application, a VIM on-board application, a VIM default configuration file, and a VIM on-board operational application.

9. The method of claim 8, wherein configuring the VIM further comprises opening the VIM off-board application and downloading the VIM on-board application.

10. The method of claim 9, wherein configuring the VIM further comprises activating the VIM on-board application using the VIM off-board application, entering a SIM configuration data in the VIM off-board application, downloading a wireless modem configuration and downloading the VIM default vehicle configuration file.

11. The method of claim 1, wherein changing the default on-board application from test to operational comprises uploading and activating a VIM on-board operational application using a VIM off-board application.

12. The method of claim 1, further comprising sending a VIM file to a vehicle telematics services provider upon shipping the VIM to a predetermined dealership, wherein the VIM file includes all VIM-relevant data.

13. The method of claim 1, wherein activating the wireless communication comprises installing a pre-activated SIM card.

14. The method of claim 1, wherein deactivating the wireless communication comprises de-activating the SIM card.

15. A method for provisioning a VIM, comprising
    receiving a VIM and entering appropriate VIM data into a dealer inventory;
    activating a SIM card for the VIM and installing the VIM in a predetermined vehicle;
    selecting a wireless activated VIM from the dealer inventory and connecting the VIM to a vehicle electrical system; and
    connecting the vehicle electrical system to the VIM and downloading a configuration file.

16. The method of claim 15, further comprising:
    accessing a telematics services provider's web portal, entering appropriate vehicle data, and associating the vehicle with the VIM;
    installing the VIM in the predetermined vehicle; and
    conducting an installation verification test.

17. The method of claim 16, further comprising logging into the telematics service provider's web portal and entering a VIM-vehicle association into the telematics service provider's database.

18. The method of claim 16, wherein conducting an installation verification test comprises turning an ignition of the vehicle on and off and observing a registration record on the telematics services provider's web portal.

19. The method of claim 16, further comprising releasing the vehicle for sale upon successfully conducting the installation verification test.

20. A method for provisioning a VIM, comprising:
    receiving VIM information from a VIM manufacturer, the VIM information including all VIM-relevant data;
    entering the VIM-relevant data in a telematics database using the VIM information; and
    associating the VIM with a dealer receiving the VIM.

21. The method of claim 20, wherein the method is performed by a telematics service provider.

22. The method of claim 21, wherein entering the VIM-relevant data in a telematics database comprises setting up a future association of the VIM with a vehicle and a customer of the telematics service provider.

* * * * *